Patented Feb. 22, 1938

2,109,159

UNITED STATES PATENT OFFICE 2,109,159

PROCESS FOR PREPARING FURFURYL-AMINES

Charles F. Winans, Akron, Ohio, assignor to Wingfoot Corporation, Wilmington, Del., a corporation of Delaware No Drawing. Application May 15, 1935, Serial No. 21,687

17 Claims. (Cl. 260—54)

This invention relates to a new and improved process of preparing furfuryl amines from furfural and ammonia. More particularly, it involves the process of mixing furfural and ammonia and hydrogenating the mass over a hydrogenation catalyst, preferably a hydrogenation catalyst of the more active type such as is suitable for the reduction of the aromatic rings of aromatic amines. For good results a solvent which dissolves the ammonia and, preferably, the furfural also, should be present. Furthermore, in order to obtain the highest yields it is desirable that all the ammonia required for the reaction be in solution.

Heretofore it has been observed that when hydro furamide, or, as it is sometimes called, tri alpha furfurylidene diamine, is treated with hydrogen in the presence of an active catalyst, under superatmospheric pressures and at temperatures in the neighborhood of 80–100° C., two water white liquids form; namely, tetrahydro alpha furfuryl amine, boiling at 150–152° C. at 735 mm. pressure, and di alpha furfuryl amine, boiling at 103–106° C. at 2–3 mm. pressure.

It is an object of this invention to provide a process whereby furfuryl amines may be prepared directly from furfural and ammonia in efficient yields and without the necessity of first preparing the reaction product of furfural and ammonia called hydro furamide. It is a further object of the invention to provide a process whereby mono alpha furfuryl amine may be prepared in large yields. Other objects and advantages will become apparent as the description of the invention proceeds.

In the practice of this invention, the reaction should be carried out at superatmospheric conditions of temperature and pressure. The temperature may vary from 50° to 200° C., but generally there will be no object in employing a temperature higher than 150–160° C. Furthermore, a temperature below 100° C. has been found to give very excellent results. The pressure also may be varied within wide limits, the range being dependent upon the absorption of hydrogen. Hydrogen will be absorbed at pressures as low as 300 pounds per square inch (20 atmospheres). The upper limit is dependent principally upon the strength of the apparatus in which the process is carried out. Generally there will be no object in employing a pressure above 150 atmospheres. Usually the most desirable pressure range will be from 50 to 120 atmospheres.

Although any of the more active hydrogenation catalysts is applicable for the practice of this invention, it has been found that the nickel catalyst prepared by the treatment of a nickel alloy, such as nickel-aluminum, or nickel-silicon, with aqueous alkalies, as described in United States Patent No. 1,628,190 to Raney, is particularly suitable. Another nickel catalyst which may be employed with excellent results is the supported nickel catalyst prepared by mixing an aqueous solution of a nickel salt and a foraminous carrier, preferably acid-washed kieselguhr, and thereafter grinding the carrier-nickel salt mixture until it is of a cream-like consistency. Following this, a carbonate precipitant which reacts basic to litmus paper, preferably an aqueous solution of an ammonium or alkali metal carbonate, such as ammonium carbonate, sodium carbonate or sodium bicarbonate, is added to the mixture, maintained during the addition of carbonate at a temperature of 70–80° C. After washing and drying, the resulting precipitated nickel carbonate is reduced in a stream of hydrogen or other reducing gas for approximately 60–80 minutes at 425–475° C., the finished catalyst containing 15±2% nickel. Other catalysts prepared in a similar manner may also be used, examples being those of copper and cobalt.

Platinum and other noble metal catalysts may be employed with very good results, but because of the lower cost of the base metal hydrogenation catalysts, the latter will generally be found more desirable.

Nickel catalysts prepared by other methods, such as the following, may also be used in the practice of the invention: (1) the reduction of nickel oxides, silicates, carbonates and bicarbonates, either supported or unsupported, by hydrogen or other reducing agent; (2) the reduction of nickel oxides, silicates, carbonates and bicarbonates in admixture with salts of other metals of Group VIII or I of Mendelejeff's Periodic Table, the reduced salts acting as co-catalysts; (3) the reduction of nickel oxides, silicates, carbonates and bicarbonates mixed with promoters such as oxides of the metals of Groups II, III, IV, V, and VI of Mendelejeff's Periodic Table; (4) anodic oxidation of nickel surfaces followed by reduction; (5) precipitation by more electropositive metals such as aluminum and zinc.

Further illustrative of the invention are the following examples, it being understood that it is not the intention that the invention be limited thereto.

*Example 1*

A mixture of 100 grams of furfural, 10 grams of a nickel catalyst prepared as described in U. S. Patent No. 1,628,190 to Raney, and 200 ml. of a cold saturated solution of ammonia in ethyl alcohol was placed in a copper liner and enclosed in a hydrogenation bomb. The mixture was shaken for 10 minutes at room temperature to allow for any preliminary reaction. Hydrogen was then introduced to a pressure of 111.5 atmospheres and the bomb and contents heated to 75° C. in a period of approximately 20 minutes. The temperature was then maintained at from approximately 75 to approximately 90° C. for a period of one hour and 35 minutes at which time the absorption of hydrogen was stopped and corresponded to the formation of a mono alpha furfuryl amine and di alpha furfuryl amine as shown in the following equations. The pressure at the end of this period had dropped to 49 atmospheres.

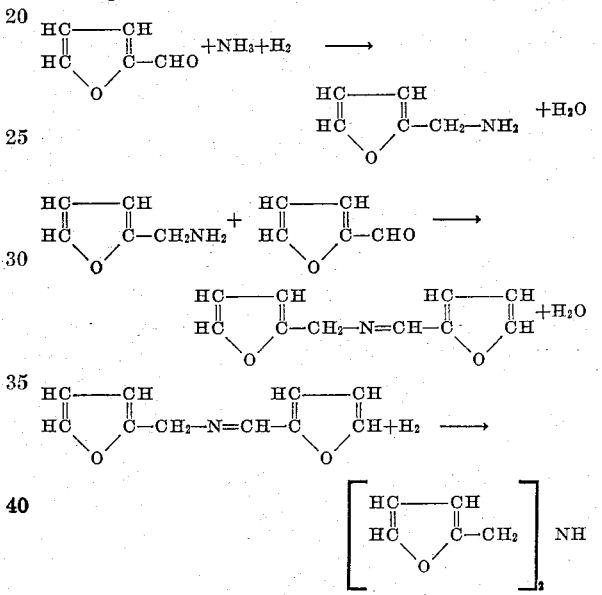

In these equations it is noted that the ratio of mols furfural to mols hydrogen absorbed is one.

The reaction product was then removed from the hydrogenation bomb and copper liner, filtered and fractionally distilled. The following fractions were obtained:

1—boiling up to 78° C. at atmospheric pressure—low boiling materials and ammonia.
2—boiling between 78°, and 45° C. at 23 mm.—200 ml. of alcohol and water.
(By titration this fraction was found to contain 4.6 grams of mono alpha furfuryl amine.)
3—boiling between 45°/23 mm. and 55°/23 mm.—74 grams of mono alpha furfuryl amine.
4—boiling between 55°/23 mm. and 130°/21 mm.—0.3 gram of an intermediate fraction.
5—boiling between 130°/21 mm. and 135°/21 mm.—19.3 grams of di alpha furfuryl amine.
6—above 135° to a state of dryness—a small tarry residue.

The mono alpha furfuryl amine which was obtained in a yield of 78.6 grams (78%) was identified by the formation of its picrate, melting point 178–180° C. The dialpha furfuryl amine which was obtained in a yield of 19.3 grams (21%) was similarly identified by the formation of its picrate, melting point 123–125° C.

*Example 2*

A mixture of 144 grams of furfural, 300 ml. of a cold saturated solution of ammonia in 2B alcohol and 10 grams of a Raney nickel catalyst was hydrogenated as described in Example 1, the pressure range being the same as that therein shown. The temperature in this experiment was raised to 150° C. during a period of 60 minutes and maintained at this figure for 30 minutes. The amount of hydrogen absorbed during this period was more than the theoretical amount required for the formation of mono alpha furfuryl- and di alpha furfuryl amine, but was less than that required for the complete formation of mono tetra hydro alpha furfuryl amine and di tetrahydro furfuryl amine. The product of hydrogenation was then treated as described in Example 1. 107 grams (71%) of primary amine were obtained and an analysis thereof for nitrogen gave a nitrogen content of 14.02%. The theoretical nitrogen content for mono furfuryl amine is 14.44% and that for mono tetrahydro alpha furfuryl amine is 14.00%. The picrate of this fraction melted at 151–155° C., thereby showing a mixture of the picrates of mono alpha furfuryl amine and mono tetrahydro furfuryl amine. The secondary amine was obtained in a yield of 8.3 grams (6%) and gave a picrate melting at 122–124° C., indicating di alpha furfuryl amine. The nitrogen analysis of the secondary amine gave 7.65% as compared with the theoretical nitrogen content of di alpha furfuryl amine of 7.56%.

In Examples 1 and 2 the ammonia required to react with the furfural was all dissolved in the solvent. It has been found that it is preferable for all the ammonia to be dissolved in the solvent but it is to be understood that the invention is not limited thereto. The invention may also be practiced by employing a solution of ammonia in a solvent which dissolves furfural, the ammonia in solution being present in an insufficient amount. Ammonia gas may then be passed into the mixture of furfural and ammonia solution until the mixture is saturated after which the mass is hydrogenated as previously described. The yields in such cases are not as high as those in which the ammonia is all dissolved in the solvent, but a large proportion of the product is the primary amine.

Illustrating the process in which an insufficient amount of ammonia dissolved in a solvent is employed is the following:

*Example 3*

A mixture of 230 grams of furfural, 10 grams of a Raney nickel catalyst which had already been used twice, but which was still very active, and 120 ml. of alcohol ammonia solution was placed in the copper liner and hydrogenation bomb and was agitated as ammonia gas was passed into the mixture until the same was saturated. Hydrogen was then introduced until the pressure reached 109 atmospheres. The temperature was raised to 90° C. during a period of 60 minutes and maintained at 90–100° C. for a period of 40 minutes longer. During this period hydrogen was absorbed to the extent of about 75% of that calculated for the formation of mono alpha furfuryl amine and di alpha furfuryl amine, the pressure varying from 109 atmospheres to 47 atmospheres. The fractional distillation of the filtered reaction mixture gave 93 grams of mono alpha furfuryl amine (40.4%), 7.6 grams of di alpha furfuryl amine (3.6%), and about 48% of a thick tar which was discarded.

In several other examples in which the ammonia dissolved in the solvent was insufficient for the reaction, thereby necessitating the introduction of ammonia in gaseous form, the temperature was not permitted to rise above 80° C. and a pressure as low as 27 atmospheres was used. The distillation of the products of each of these several experiments gave approximately 44% primary amine, 6% secondary amine and approximately 40% tar.

*Example 4*

Illustrating the practice of the invention in which an excess of ammonia in solution is employed, 92 grams of furfural, 200 ml. of a saturated solution of alcoholic ammonia and 10 grams of a Raney nickel catalyst were placed in a hydrogenation bomb and subjected to an initial hydrogen pressure of 107 atmospheres. The temperature was raised to 86° C. in a period of 40 minutes and maintained at 75–85° C. for 40 minutes longer. At the end of the time the theoretical amount of hydrogen for mono alpha furfuryl amine and di alpha furfuryl amine had been adsorbed. The reaction was then stopped, the product filtered and thereafter fractionally distilled. The following fractions were obtained:

1—boiling up to 75° C. at atmospheric pressure—low boiling materials and ammonia.

2—boiling between 75° C. and 45° C. at 22 mm.—200 ml. of alcohol and water. (By titration this fraction was found to contain 8.1 grams of mono alpha furfuryl amine.)

3—boiling between 45° C./22 mm. and 60° C./22 mm.—60.1 grams of mono alpha furfuryl amine.

4—boiling between 60° C./22 mm. and 130° C./22 mm.—0.8 grams of di alpha furfuryl amine.

5—boiling between 130° C./22 mm. and 135° C./22 mm.—12.5 grams of di alpha furfuryl amine.

6—above 135° C. to dryness—6.9 grams of tarry residue.

The 68.2 grams of mono amine and 13.3 grams of di amine were equivalent, respectively, to yields of 92.1% and 84.2% of those theoretically possible.

From these illustrative examples it is apparent that the invention provides a process in which furfuryl amines, and particularly the primary amines, may be obtained in excellent yields. While the process should preferably employ ammonia all of which is dissolved in a solvent, it will be understood that the invention is not limited thereto but that the ammonia may be added in gaseous form. When a solvent is employed, instead of mixing with the furfuryl a solution of ammonia, the solvent and furfuryl may first be mixed and gaseous ammonia passed therein. The ammonia appears to dissolve in the solvent before undergoing any reaction with the furfuryl. Furthermore, while alcohol has been employed in the illustrative examples, it will be understood that any solvent in which ammonia and furfuryl will dissolve and which is inert in the reaction may be employed. It is also desirable, although not necessary, that the products of the reaction be soluble in the solvent. However, most solvents in which the ammonia and furfuryl will dissolve are also solvents for the products of the process of the invention. Other solvents are methanol, isopropyl alcohol, ether and di oxane. The alcohols and, particularly, ethyl alcohol, are preferred, but the invention is not limited thereto.

For the preparation of mono alpha furfuryl amine the temperature should be maintained below 100° C., and for the preparation of mono tetrahydro alpha furfuryl amine, a temperature above 110° C. and preferably not over 150° C. should be used. Higher temperatures may be employed but are not desirable because of the fact that the furane ring has a tendency to become disrupted at a temperature in the neighborhood of 200° C. Similarly, while the catalyst employed in the specific examples is a Raney nickel catalyst, it will be understood that any of the more active hydrogenation catalysts may be used to advantage.

It is apparent that the specific details of my invention may be widely varied without departing from the inventive concept; indeed, changes will readily suggest themselves to one skilled in the art. It will accordingly be understood that it is desired to embrace within the scope of this invention such modifications and changes as may be necessary to adapt it to varying conditions and uses. It is intended that the patent shall cover, by suitable expressions in the appended claims, whatever features of patentable novelty reside in the invention.

What I claim is:

1. A process of preparing furfuryl amines which comprises hydrogenating under superatmospheric conditions of temperature and pressure and in the presence of a base metal hydrogenation catalyst, furfural and a solution of ammonia in an inert organic solvent which dissolves furfural and ammonia, the ammonia being present in excess.

2. A process of preparing furfuryl amines which comprises hydrogenating under a pressure upwards of about 20 atmospheres, at a temperature from 50° C. to 200° C., and in the presence of a nickel-containing hydrogenation catalyst, furfural and a solution of ammonia in an inert organic solvent which dissolves furfural and ammonia the ammonia being present during hydrogenation in excess of the amount corresponding molecularly to hydrofuramide.

3. A process of preparing furfuryl amines which comprises treating with hydrogen and ammonia under a pressure upwards of about 20 atmospheres, at a temperature from 50° C. to 200° C., and in the presence of a base metal hydrogenation catalyst, a solution of substantially equi-molar proportions of furfural and ammonia in an inert organic solvent in which furfural and ammonia are soluble.

4. A process of preparing furfuryl amines which comprises treating with hydrogen and ammonia under a pressure upwards of about 20 atmospheres, at a temperature from 50° C. to 200° C., and in the presence of a base metal hydrogenation catalyst, an alcoholic solution of substantially equimolar proportions of furfural and ammonia.

5. A process of preparing furfuryl amines which comprises treating with hydrogen and ammonia under a pressure upwards of about 20 atmospheres, at a temperature from 50° C. to 200° C., and in the presence of a nickel hydrogenation catalyst, an alcoholic solution of substantially equi-molar proportions of furfural and ammonia.

6. A process of preparing furfuryl amines which comprises hydrogenating under a pressure upwards of about 20 atmospheres, at a temperature from 50° C. to 200° C., and in the presence of a nickel catalyst prepared by the treatment of a nickel, aluminum alloy with an aqueous alkali, furfural and a solution of ammonia in an inert organic solvent which dissolves furfural and ammonia, said ammonia being present in excess of the furfural.

7. A process of preparing furfuryl amines which comprises hydrogenating under a pressure upwards of about 20 atmospheres, at a temperature from 50° C. to 200° C., and in the presence of a nickel catalyst prepared by the treatment of a nickel aluminum alloy with aqueous alkali, furfural and a solution of ammonia in an inert organic solvent which dissolves furfural and ammonia, an excess of ammonia over that required for the reaction being dissolved in the solvent.

8. The process of preparing furfuryl amines which comprises hydrogenating under a superatmospheric pressure upwards of about 20 atmospheres, at a temperature from 50° C. to 200° C., and in the presence of an active hydrogenation catalyst, furfural and ammonia, the furfural and an excess of ammonia being dissolved in an inert organic solvent.

9. A process of preparing mono alpha furfuryl amine and di alpha furfuryl amine which comprises hydrogenating under a superatmospheric pressure of from 20 to 200 atmospheres, at a temperature between 50 and 100° C. and in the presence of an active nickel hydrogenation catalyst, furfural and ammonia, the furfural and an excess of ammonia being dissolved in ethyl alcohol.

10. A process of preparing mono alpha furfuryl amine and di alpha furfuryl amine which comprises hydrogenating under a superatmospheric pressure of from 20 to 200 atmospheres, at a temperature between 50 and 100° C. and in the presence of an active nickel hydrogenation catalyst, furfural and ammonia, the furfural and an excess of ammonia being dissolved in an aliphatic alcohol.

11. A process of preparing mono alpha furfuryl amine and di alpha furfuryl amine which comprises hydrogenating under a superatmospheric pressure of from 20 to 200 atmospheres, at a temperature between 50 and 100° C. and in the presence of an active nickel hydrogenation catalyst, furfural and an excess of ammonia, the furfural and ammonia being dissolved in an inert organic solvent.

12. The process of preparing primary furfuryl amines and di alpha furfuryl amines which comprises hydrogenating under a superatmospheric pressure of from 20 to 200 atmospheres at a temperature ranging from 50 to 200° C. and in the presence of an active hydrogenation catalyst, furfural and an excess of ammonia, the furfural and ammonia being dissolved in an inert organic solvent.

13. A process of preparing mono alpha furfuryl amine and di alpha furfuryl amine which comprises hydrogenating under a pressure which may range from 20 to 200 atmospheres, at a temperature between 50 and 100° C. and in the presence of a nickel catalyst prepared by the treatment of a nickel aluminum alloy with an aqueous alkali, alpha furfural and a solution of ammonia in an inert organic solvent in which furfural and ammonia are soluble, an excess of ammonia over that required for formation of hydrofuramide being dissolved in the solvent.

14. The process which comprises catalytically hydrogenating furfural and a solution of an excess of ammonia in an inert organic solvent which dissolves furfural and ammonia.

15. The process which comprises catalytically treating with hydrogen and ammonia an alcoholic solution containing both ammonia and furfural in approximately equi-molar proportions.

16. The process which comprises catalytically hydrogenating furfural in the presence of ammonia in excess of the amount which would be required to react with the furfural to form hydrofuramide.

17. The process of preparing furfuryl amines which comprises hydrogenating under a pressure upwards of about 20 atmospheres, at a temperature of from 50° C. to 200° C., in the presence of an active hydrogenation catalyst, and in the presence of an inert organic solvent, a mixture of furfural and in excess of ammonia over that which would be required to react with the furfural to form hydrofuramide.

CHARLES F. WINANS.